(12) United States Patent
Shiau et al.

(10) Patent No.: US 7,961,390 B2
(45) Date of Patent: Jun. 14, 2011

(54) SCREEN OF PROJECTOR

(75) Inventors: Tzeng-Ke Shiau, Hsinchu (TW); Chun-Chien Liao, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 122 days.

(21) Appl. No.: 12/588,133

(22) Filed: Oct. 6, 2009

(65) Prior Publication Data

US 2010/0091366 A1    Apr. 15, 2010

(30) Foreign Application Priority Data

Oct. 15, 2008  (TW) ................................ 97139620 A

(51) Int. Cl.
*G03B 21/60*    (2006.01)
(52) U.S. Cl. ........................................ 359/454; 359/459
(58) Field of Classification Search .................. 359/454, 359/449, 459
See application file for complete search history.

(56) References Cited

U.S. PATENT DOCUMENTS

| 7,164,536 | B2 * | 1/2007 | Whitehead | 359/459 |
| 7,667,893 | B2 * | 2/2010 | Peterson et al. | 359/459 |
| 7,715,098 | B1 * | 5/2010 | Sweatt | 359/455 |
| 7,869,126 | B2 * | 1/2011 | Akiyama | 359/454 |

FOREIGN PATENT DOCUMENTS

JP       03-156435    *    7/1991

* cited by examiner

*Primary Examiner* — Christopher Mahoney
(74) *Attorney, Agent, or Firm* — Bacon & Thomas, PLLC

(57) ABSTRACT

A screen of a projector having a substrate and a plurality of asymmetric optical structures is provided. There is a plurality of light absorbing zones and a plurality of reflective zones alternatively disposed on a surface of the substrate facing the projector. The asymmetric optical structures are disposed on the surface of the substrate and correspond to the reflective zones, respectively. The asymmetric optical structure has a first curved surface and a second curved surface, and the first curved surface protrudes toward the projector for converging an incident light from the projector on the reflective zone, and the second curved surface is disposed at a side of the first curved surface away from the projector for refracting a reflective light from the reflective zones toward the normal direction of the surface of the substrate.

9 Claims, 3 Drawing Sheets

SCREEN OF PROJECTOR

CROSS-REFERENCE TO RELATED APPLICATION

This application claims the priority benefit of Taiwan application serial no. 097139620, filed on Oct. 15, 2008. The entirety of the above-mentioned patent application is hereby incorporated by reference herein and made a part of this specification.

BACKGROUND OF THE INVENTION (1) Field of the Invention

The invention relates to a screen adapted to a projector, particularly to a screen adapted to a projector and capable of blocking scattering light.

(2) Description of the Related Art

FIG. 1 is a schematic view of a conventional screen 100 adapted to a projector. As shown in FIG. 1, the screen 100 includes a plurality of transparent pearl structures 120 densely arranged in the screen 100. After an incident light R1 from an image source 200 is incident on the screen 100 along a specific angle, the incident light R1 is diffused and reflected by the pearl structures 120, then the scope of the emitting angle of a reflective light R2 is enlarged, so that the view angle is enlarged.

Though the screen 100 is capable of enlarging the view angle, the pearl structures 120 of the screen 100 may diffusely reflect the scattering light from the environment, such as the light from the fluorescent lamp, and transmit the light to the eyes of the viewer. On the one hand the scattering light lowers the contrast of the image, and on the other hand the scattering light may cause the glare, so that the viewer is uncomfortable.

SUMMARY OF THE INVENTION

The invention is to provide a screen adapted to a projector, capable of providing an image having a large view angle and blocking scattering light from affecting the image.

For achieving one, some or all of the above mentioned object, a screen adapted to a projector is provided as an embodiment of the invention. The screen includes a substrate and a plurality of asymmetric optical structures. The substrate has a surface facing the projector and a plurality of light absorbing zones and a plurality of reflective zones alternatively disposed on the surface. The asymmetric optical structures are disposed on the surface of the substrate facing the projector and correspond to the reflective zones, respectively. Each of the asymmetric optical structures includes a first curved surface and a second curved surface thereon. The first curved surface protrudes toward the projector for converging an incident light from the projector on the reflective zone. The reflective zone reflects the incident light to form a reflective light and the incident light is incident on the surface of the substrate obliquely. The second curved surface is disposed at a side of the first curved surface away from the projector for refracting the reflective light and allowing the reflective light to transmit toward the normal direction of the surface of the substrate. A curvature radius of the first curved surface is greater than a curvature radius of the second curved surface.

As compared to the conventional screen, an embodiment of the invention provides a screen, and a surface of the screen has a plurality of asymmetric optical structures capable of converging an inclined incident light from the projector on the reflective zones. As to the other light having different incident angles (such as the light from the fluorescent lamp) is refracted to the light absorbing zones surrounding the reflective zones, so that the scattering light is blocked, the glare is avoided, and the contrast of the image is maintained.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention will now be specified with reference to its embodiment illustrated in the drawings, in which.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
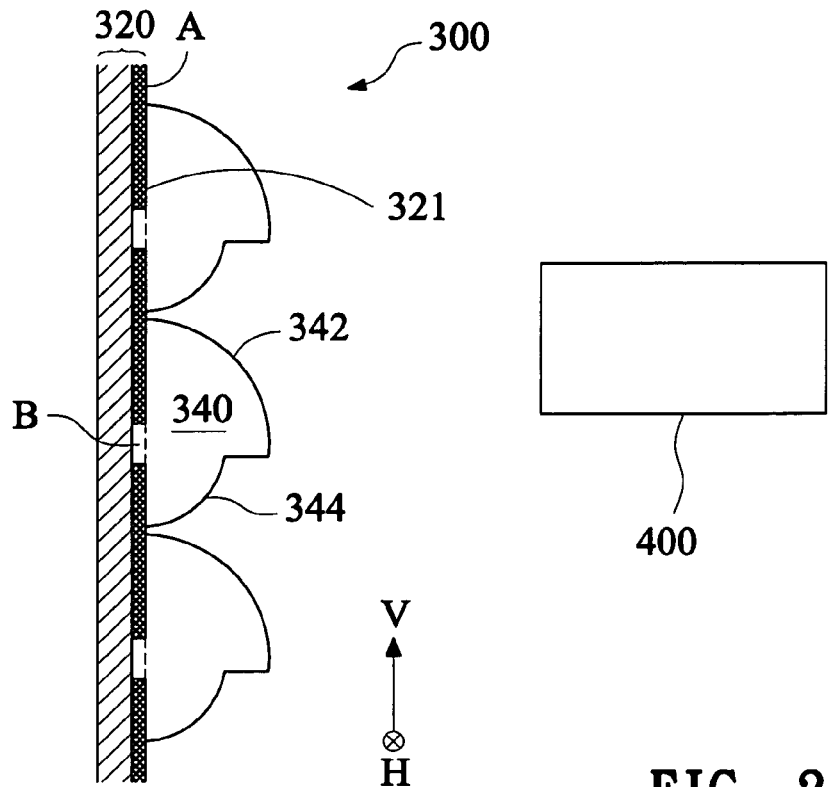
FIG. 2 is a cross section view of a screen adapted to a projector according to an embodiment of the invention.

FIG. 2 is a cross section view of a screen 300 adapted to a projector 400 according to an embodiment of the invention. The sectional direction is along the vertical direction of the screen 300. The screen 300 includes a substrate 320 and a plurality of asymmetric optical structures 340. The substrate 320 has a surface 321 facing the projector 400 and a plurality of light absorbing zones A and a plurality of reflective zones B alternatively disposed on the surface 321. The asymmetric optical structures 340 are disposed on the surface 321 of the substrate 320 and correspond to the reflective zones B, respectively. In the embodiment of the invention, the light absorbing zones A of the surface 321 of the substrate 320 are absorbing material layers and the reflective zones B of the surface 321 of the substrate 320 are reflective films, such as metal reflection films or multilayer optical reflection films. But it does not limit the invention, the reflective zones B of the surface 321 of the substrate 320 also may be diffusive reflection layers. The diffusive reflection layers are capable of reflecting the light from the projector 400 and enlarging the scope of the emitting angle of the reflective light to enlarge the view angle. Still referring to the FIG. 2, in the embodiment, the absorbing material layers are fabricated first to form the light absorbing zones A, then openings are fabricated in the absorbing material layers and the reflective films are disposed in the openings to form the reflective zones B. But it does not limit the invention, as to an embodiment, the reflective films are fabricated and disposed on the surface of the absorbing material layers to form the reflective zones B.

Figure 3:
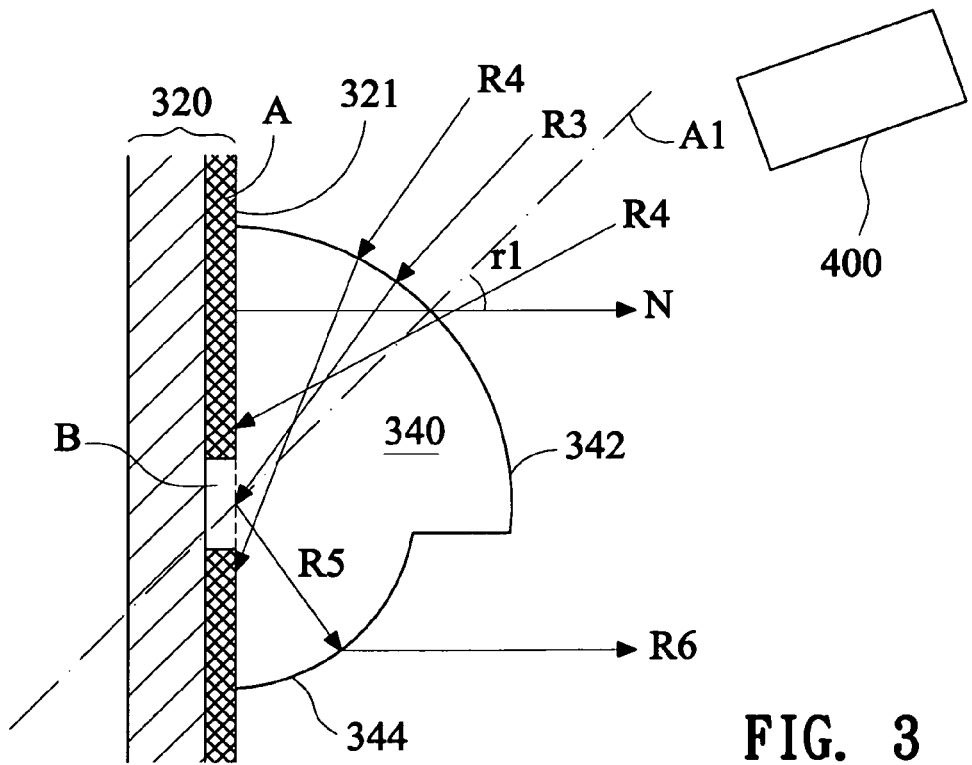
FIG. 3 is an enlarged view of asymmetric optical structures of FIG. 2.

FIG. 3 is an enlarged view of the asymmetric optical structures of FIG. 2. Referring to FIG. 3, the asymmetric optical structures 340 are fabricated by transparent materials. A surface of each of the asymmetric optical structures 340 includes a first curved surface 342 and a second curved surface 344 thereon. Referring to FIG. 2 at the same time, in the embodiment, the projector 400 is disposed at a high position, so that the first curved surface 342 protrudes toward the right and the upward direction (toward the projector 400). The first curved surface 342 refracts an incident light R3 from the projector 400 and converges the incident light R3 on the reflective zones B, and the reflective zones B reflect the incident light R3 to form a reflective light R5. The incident light R3 is incident on the surface 321 of the substrate 320 obliquely. It is noticeable that the other light R4 having different incident angles (such as the lights from the fluorescent lamp) is refracted to the light absorbing zones A surrounding the reflective zones B by the first curved surface 342, so that the scattering light is blocked, the glare is avoided, and the contrast of the image is maintained.

As to an embodiment, the first curved surface 342 constitutes a first lens structure, and a focus of the first lens structure is disposed at the reflective zone B substantially. There is an inclined angle r1 between an optical axis A1 of the first lens structure and the normal direction N of the surface 321 of the substrate 320. When the projector 400 is disposed on the optical axis A1 of the first lens structure substantially, most of the inclined incident light R3 from projector 400 passes through the first lens structure and is converged to the reflective zones B by the first lens structure.

The second curved surface 344 is disposed at a side of the first curved surface 342 away from the projector 400 to refract the reflective light R5 from the reflective zones B and allow the reflective light R5 for transmitting toward the normal direction N of the surface 321 of the substrate 320. In the embodiment, the projector 400 is disposed at a high position, so that the second curved surface 344 is disposed under the first curved surface 342. Still as to an embodiment, the second curved surface 344 constitutes a second lens structure, and a focus of the second lens structure is disposed at the reflective zone B substantially. The reflective light R5 from the reflective zones B passes through the second lens structure and is converted into a reflective light R6 projected toward the normal direction N of the surface 321 of the substrate 320.

In addition, in order to avoid the inclined incident light R3 from the projector 400 which is projected onto the second curved surface 344 directly but not passing through the first curved surface 342 forming the scattering light and causing the light energy loss, as to an embodiment shown in FIG. 3, a curvature radius of the first curved surface 342 is greater than a curvature radius of the second curved surface 344. Namely, the first curved surface 342 protrudes the outer portion of the second curved surface 344 to avoid the inclined incident light R3 from projector 400 projecting onto the second curved surface 344.

Referring to FIG. 2, in the embodiment, the asymmetric optical structures 340 are densely arranged on the surface 321 of the substrate 320 facing the projector 400 and each of the asymmetric optical structures 340 is in the shape of a column and extends along the horizontal direction H of the screen 300. But it does not limit the invention, as to the embodiment, the projector 400 is disposed at a higher position relative to the screen 300, so that each of the asymmetric optical structures 340 is in the shape of a column and extends along the horizontal direction H of the screen 300. If the projector 400 is disposed at the left side of the screen 300, as to an embodiment, each of the asymmetric optical structures 340 is in the shape of a column and extends along the vertical direction V of the screen 300.

The asymmetric optical structure 340 of the embodiment of the invention is not limited to long column, it also may be short column. The asymmetric optical structure 340 is distributed on the surface 321 of the substrate 320 facing the projector 400 in array and the first curved surface 342 of the asymmetric optical structure 340 is not limited to protrude toward the same angle. The angle is adjusted according to the angle of the incident light. For example, the optical axis A1 of the first curved surface 342 of the asymmetric optical structure 340 is randomly distributed in the scope of an angle.

Figure 4:
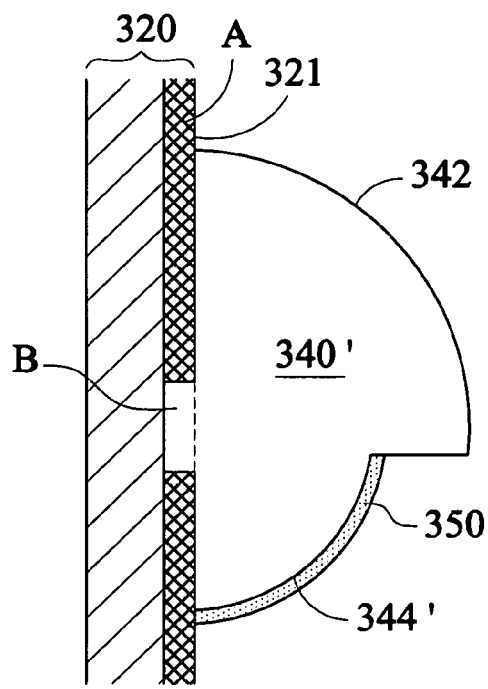
FIG. 4 is an enlarged view of the asymmetric optical structures of FIG. 2 according to another embodiment of the invention.
Figure 5:
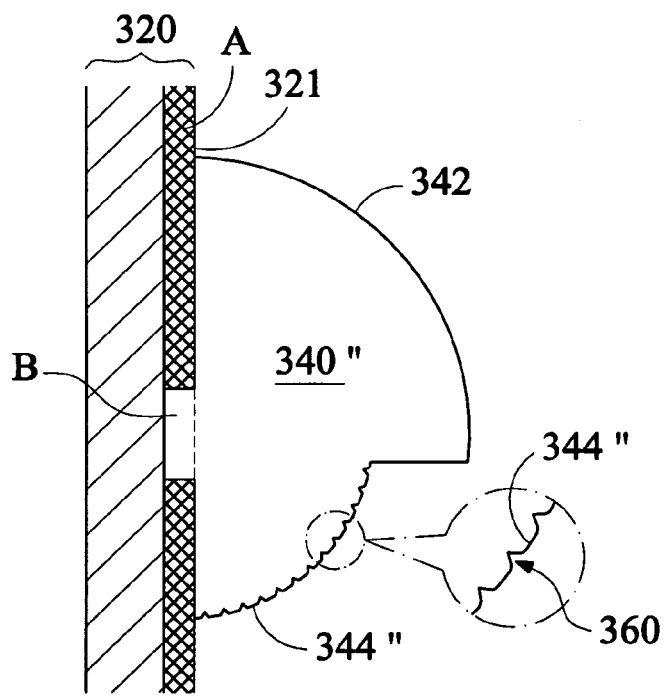
FIG. 5 is an enlarged view of the asymmetric optical structures of FIG. 2 according to still another embodiment of the invention.

FIG. 4 is an enlarged view of asymmetric optical structures 340' of FIG. 2 according to another embodiment of the invention. As compared to the embodiment of FIG. 3, The asymmetric optical structures 340' further includes an optical diffusion layer 350 disposed on a second curved surface 344' to enlarge the scope of the angle of the reflective light R6 passing through the second curved surface 344' for enlarging the view angle of the viewer. But it does not limit the invention, in order to simplify the fabrication process, as to an embodiment shown in FIG. 5, a plurality of microstructures 360 are fabricated on the second curved surface 344" of the asymmetric optical structure 340" directly instead of the optical diffusion layer 350. The microstructures 360 may be a concave hole, protrude particle, or concave groove having light scattering effect, and the concave groove is shown in FIG. 5 as an example.

Figure 1:
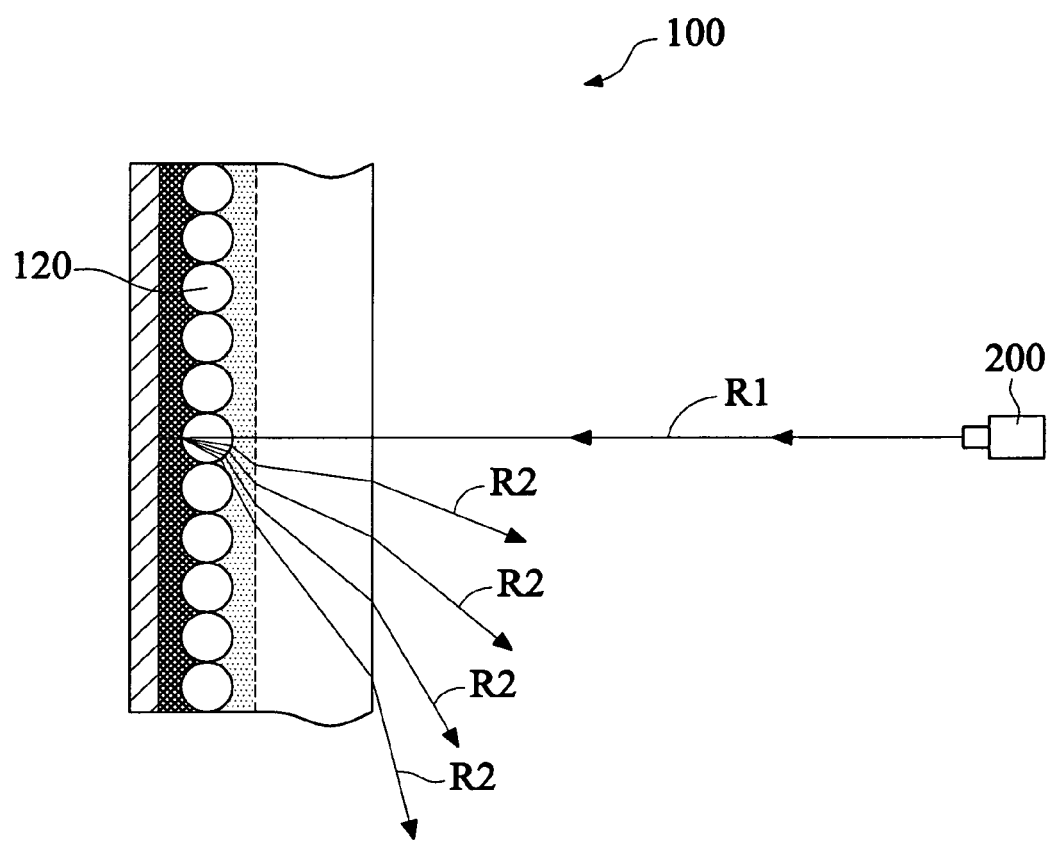
FIG. 1 is a cross section view of a conventional screen adapted to a projector.

As compared to the conventional screen 100 shown in FIG. 1 which is not capable of blocking scattering light, lowers the contrast of the image, and causes viewing glare. As shown in FIG. 2, the embodiment of the invention provides a screen 300 including the asymmetric optical structure 340 capable of converging the inclined incident light from the projector 400 on the reflective zones B, and then projecting the reflective light R5 outside. As to the other light R4 having different incident angles is refracted to the light absorbing zones A surrounding the reflective zones B, and the light R4 is absorbed. Thus, the embodiment of the invention provides the screen 300 capable of blocking the scattering light to avoid the glare and maintaining the contrast of the image.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A screen, adapted to a projector, comprising:
   a substrate, having a surface facing the projector and a plurality of light absorbing zones and a plurality of reflective zones alternatively disposed on the surface; and
   a plurality of asymmetric optical structures, disposed on the surface of the substrate and corresponding to the reflective zones respectively, and each of the asymmetric optical structures comprising:
   a first curved surface, protruded toward the projector for converging an incident light from the projector on the reflective zone, and the reflective zone reflecting the incident light to form a reflective light, wherein the incident light is incident on the surface of the substrate obliquely;
   a second curved surface, disposed at a side of the first curved surface away from the projector for refracting the reflective light and allowing the reflective light to transmit toward the normal direction of the surface of the substrate, wherein a curvature radius of the first curved surface is greater than a curvature radius of the second curved surface.

2. The screen of claim 1, wherein the first curved surface constitutes a first lens structure, and a focus of the first lens structure is disposed at the reflective zone substantially.

3. The screen of claim 2, wherein the projector is disposed on an optical axis of the first lens structure substantially.

4. The screen of claim 1, wherein the second curved surface constitutes a second lens structure, and a focus of the second lens structure is disposed at the reflective zone substantially.

5. The screen of claim 1, wherein the asymmetric optical structure is in the shape of a column and extends along the horizontal direction of the screen.

6. The screen of claim 1, wherein the second curved surface comprises a plurality of microstructures.

7. The screen of claim 6, wherein the microstructures comprise a concave hole, a protrude particle or a concave groove.

8. The screen of claim 1, wherein each of the asymmetric optical structures further comprises a light diffusion layer disposed on the second curved surface.

9. The screen of claim 1, wherein the reflective zones comprise a diffusive reflection layer, a metal reflection film, or a multilayer optical reflection film.

* * * * *